United States Patent [19]
Neikam

[11] 3,883,607
[45] May 13, 1975

[54] OLEFIN HYDROGENATION USING $H_nMoO_3$

[75] Inventor: William C. Neikam, Chester, Pa.

[73] Assignee: Sun Ventures, Inc., St. Davids, Pa.

[22] Filed: Feb. 13, 1974

[21] Appl. No.: 442,268

Related U.S. Application Data

[62] Division of Ser. No. 270,751, July 11, 1972, abandoned.

[52] U.S. Cl. ............ 260/683.9; 260/683.2; 252/467
[51] Int. Cl. ............................................... C07c 5/02
[58] Field of Search ....... 260/683.9, 683.2; 252/467

[56] References Cited
UNITED STATES PATENTS

| | | | |
|---|---|---|---|
| 2,584,531 | 2/1952 | Arnold | 260/683.9 |
| 2,739,133 | 3/1956 | Schwarzeubek | 252/467 |
| 3,755,146 | 8/1973 | Harris et al. | 252/467 |

*Primary Examiner*—Veronica O'Keefe
*Attorney, Agent, or Firm*—George L. Church; Donald R. Johnson; Paul Lipsitz

[57] ABSTRACT

A novel compound having the formula $H_nMoO_3$ where $n$ is from about 1.5 to about 2.5, useful as a source of hydrogen and for hydrogenation, and its preparation by adsorbing hydrogen on molybdenum oxide at room temperature and in the presence of palladium or platinum.

2 Claims, No Drawings

OLEFIN HYDROGENATION USING $H_xMOO_3$

This is a division of application Ser. No. 270,751, filed July 11, 1972, and now abandoned.

It is known in the art that numerous metal oxides may be reduced to a lower oxide or to the free metal by reduction with hydrogen at elevated temperatures. For example, reduction of $MoO_3$ with hydrogen at 300° to 400°C proceeds smoothly to yield $MoO_2$. It is also known that tungsten oxide ($WO_3$) in the presence of water and platinum black will adsorb hydrogen at room temperature to yield a compound containing less than one mole of hydrogen; e.g., $H_{0.35}WO_3$ (Benson, Kohn, and Boudart, Science 145 p. 149, 1964 and Journal of Catalysis 5, 307–313, 1966). This compound of the above gross molar composition is considered by the authors as a hydrogen analogue of the tungsten bronzes which are a series of non-stoichiometric compounds of the general formula $M_xWO_3$ where M is a metal other than tungsten and x is greater than zero but less than one (see Kirk Othmer Encyclopedia of Chemical Technology, vol. 22, p. 350).

It has now been found that molybdenum oxide ($MoO_3$) is affected in an unexpected manner when subjected to treatment with hydrogen under certain conditions. Thus, in accord with the invention, novel compounds useful as catalysts and as a source of hydrogen are provided by treating $MoO_3$ with hydrogen at room temperature (e.g., from about 20° to about 30°C) and in the presence of palladium or platinum, said molybdenum oxide having adsorbed an activating compound on its surface, said activating compound being preferably water. The invention also provides novel compounds of gross molar composition $H_nMoO_3$ where n is from about 1.5 to about 2.5 and the invention further contemplates a process of hydrogenatin with these compounds.

In carrying out the process of the invention, the molybdenum oxide is ground to a fine powder and the palladium or platinum incorporated. The particle size of the ground material is not a critical factor, but in general, the molybdenum oxide will be reduced to about 100 microns in particle size. The palladium or platinum necessary for the hydrogen adsorption to occur may be incorporated either as a black or on a support such as $Al_2O_3$, silica, zeolites, and the like. In either case an amount of from about 1 to about 4% by weight of the molybdenum oxide will be used, preferably from about 3 to 4%. The palladium or platinum is simply mixed in with the molybdenum oxide and is then ready for further processing. This mixture is subjected to a vacuum system in order to evacuate air. Normally the pressure of the system is reduced to about $10^{-3}$ torr and after remaining at this pressure for about 1 hour all of the air is effectively removed. Then the air free sample is exposed to water vapor or other activating vaporous material which is introduced into the vacuum system. This treatment is generally carried out at 0° C to about 25°C for a perod of time of from several minutes to about 1 hour, although neither time nor temperature is a critical factor. It is believed that the water vapor activates the oxidepalladium (or platinum) combination by providing a bridge which binds the metal to the oxide. Other such activating or bridging agents include a wide variety of compounds including polar and non-polar agents such as hydrocarbons, alcohols, ketones, and the like. Specific examples of such materials include water (the preferred agent), ethanol, acetone, polyaromatic and cycloaliphatic hydrocarbons (e.g., anthracene, perylene, perhydrophenanthrene, etc.), greases, oils, waxes, and the like. It is a simple matter to find a suitable bridging agent by experiment, the uptake of hydrogen on the treated oxide being indicative of activity. It will be understood that if the molybdenum oxide is available as a hydrate, it may be used directly without the above treatment. However, if the molybdenum oxide is free of any activating agent, hydrogen adsorption will not occur.

After the activating or bridging material has been in the vacuum system for the desired time, the vacuum is again applied to remove any excess not adsorbed on the molybdenum oxide and then hydrogen gas is introduced into the system. The hydrogen gas is allowed to expand into the system and built up to any reasonable pressure, usually about 250 torr. The hydrogen gas is adsorbed by the oxide-metal system and when the hydrogen pressure drops to a low value, more hydrogen is introduced and adsorption again allowed to occur. This procedure is repeated until no more hydrogen is taken up. From the known volume of the system and the hydrogen pressure used, the amount of hydrogen taken up by the oxide is readily calculated from the ideal gas law.

It is quite unexpected that the molybdenum oxide adsorbs such a large volume of hydrogen and the system provides a large source of hydrogen from a small volume of the oxides. Thus, for example, with $H_2MoO_3$ of about 100 micron particles size about 32 cc of the oxide at standard temperature and pressure provides a source for one mole of hydrogen. This is quite remarkable when it is realized that at standard temperature and pressure one mole of hydrogen alone occupies a volume of 22.4 liters.

The compounds of the invention have the gross molar composition indicated by the formula $H_nMoO_3$ where n is from about 1.5 to about 2.5, the actual number of moles of hydrogen in the molecule depending upon the extent to which hydrogen is allowed to be taken up. It will be understood that where n is other than two, the compounds are non-stoichiometric and this is consistent with the known bronzes of tungsten. However, a significant and meaningful difference between the compounds of this invention and the prior art compounds is that the compounds of this invention contain more hydrogen per mole of metal oxide and thus provide a more efficient hydrogen storage system. The compounds are blue-black solids and burn spontaneously in air. The X-ray diffraction of the compounds do not match any of the patterns in the ASTM file and may be characterized, for example, by the following table of "d" values and intensities for $H_2MoO_3$ as all of the compounds have similar X-ray diffraction patterns:

X-Ray Diffraction Pattern for $H_2MoO_3$

| d | I | d | I |
| --- | --- | --- | --- |
| 6.95 | 13200 | 1.817 | 220 |
| 4.05 | 60 | 1.80 | 50 |
| 3.95 | 20 | 1.778 | 90 |
| 3.79 | 50 | 1.76 | 914 |
| 3.63 | 3750 | 1.74 | 710 |
| 3.47 | 205 | 1.667 | 160 |
| 3.40 | 300 | 1.644 | 118 |
| 3.30 | 50 | 1.634 | 72 |

-Continued

X-Ray Diffraction Pattern for $H_2MoO_3$

| d | I | d | I |
|---|---|---|---|
| 2.923 | 103 | 1.577 | 82 |
| 2.725 | 560 | 1.545 | 117 |
| 2.685 | 130 | 1.535 | 55 |
| 2.55 | 275 | 1.516 | 85 |
| 2.41 | 160 | 1.463 | 270 |
| 2.32 | 3000 | 1.43 | 100 |
| 2.257 | 230 | 1.390 | 55 |
| 2.238 | 355 | 1.378 | 172 |
| 2.07 | 30 | 1.36 | 70 |
| 2.02 | 256 | 1.342 | 102 |
| 2.00 | 135 | 1.30 | 30 |
| 1.953 | 206 | 1.289 | 70 |
| 1.913 | 206 | 1.278 | 160 |
| 1.884 | 605 | | |

The compounds of the invention are useful for hydrogenating olefins and the olefin need only be passed over the heated compound (usually at about 75°C to about 200°C) to effect hydrogenation.

The compounds will also have particular utility wherever hydrogen is needed under limited storage conditions. Thus, the compounds will be of value as a source of hydrogen in equipment used in outer space, in undersea applications and in hydrogen fueled electrical and transportation devices.

In order to more fully describe and illustrate the invention, the following examples are given:

EXAMPLE 1

Using a mortar and pestle, 3.0005 g of commercial $MoO_3$ was ground for about 10 minutes with 0.1257 g of platinum black.

Of the above mixture, 0.20008 g is placed in a pyrex container and attached to a vacuum system. The total volume of the container with the $Pt/MoO_3$ and vacuum system is 18.9 cc, the vacuum system alone being 0.7 cc. The system is evacuated to $10^{-3}$ torr and is exposed to water vapor which is introduced by means of a bulb containing degassed water connected to the vacuum system by a stopcock. After the water vapor is introduced, the system is again evacuated for $10^{-3}$ torr. Hydrogen is then added to the system to a pressure of 250 torr and a stopcock separating the system from the $Pt/MoO_3$ mixture is opened and the pressure begins to drop reaching 2 torr after 3 minutes. This procedure is continued for several additions of $H_2$ at which time further uptake of $H_2$ does not occur. The mixture $Pt/MoO_3$ is a light gray color, upon exposure to $H_2$ it turns blue black and much heat is evolved. The reaction is nearly 80% complete in 15 minutes. The total $H_2$ uptake is calculated from the pressure changes and known volume to be 6255.08 $\mu$ moles/g catalyst. this gives an empirical formula of $H_{1.x}MoO_3$. Exposure of air results in the rapid reoxidation to $MoO_3$.

EXAMPLE 2

One gram of $MoO_3$ is placed in a vacuum system as in Example 1 and exposed to $H_2O$ vapor and $H_2$. After 2 hours there was no detectable $H_2$ uptake and no color change. The presence of platinum or palladium is essential for hydrogen uptake.

EXAMPLE 3

Of the mixture of $Pt/MoO_3$ used in Example 1, 0.2032 g is placed in a vacuum system as in Example 1 and evacuated to $10^{-3}$ torr at 300°C for 16 hours. This procedure removes any water that may be adsorbed on the $MoO_3$. The sample is brought to room temperature and $H_2$ admitted. After 2 hours there is no detectable $H_2$ uptake and no color change. This shows the importance of $H_2O$ as a bridge. The sample is re-evacuated, $H_2O$ vapor is added and the experiment of Example 1 carried out. Hydrogen is taken up to give a compound of empirical formula $H_{1.9}MoO_3$.

EXAMPLE 4

Using a mortar and pestle 3.0000 g of commercial $MoO_3$ is ground for about 10 minutes with 0.2007 g of palladium black.

The above mixture is placed in a pyrex container whose volume is 7 cc and attached to a vacuum system whose volume is 750 cc. The entire system is evacuated to $10^{-3}$ torr. The mixture is exposed to water vapor from a bulb attached to the system by means of a stopcock, the bulb containing degassed water. The system is then re-evacuated to $10^{-3}$ torr and hydrogen gas is added to the vacuum system to a pressure of 650 torr. A stopcock separating the hydrogen system from the $Pd/MoO_3$ is opened and the pressure begins to drop and after 6 hours is 8.13 torr. The $Pd/MoO_3$ mixture is originally light gray in color, but upon exposure to $H_2$ it turns blue black and much heat is evolved. The total hydrogen uptake is calculated from the pressure changes and known volume to be 22.9 millimoles per g catalyst. This gives an empirical formula of $H_{2.2}MoO_3$.

X-ray diffraction of this compound shows it to be the same as that produced when the experiment is carried out with platinum instead of palladium and is characterized by the table above. Exposure to air results in the reoxidation to $MoO_3$.

EXAMPLE 5

A portion of the sample used in Example 1 is evacuated at 300°C for 16 hours to remove $H_2O$. To this sample a solution of perylene in $CCl_4$ is added. The $CCl_4$ is removed by evacuating at 80°C. The final concentration of perylene on the sample is 8 $\mu$ moles per gram. When the perylene loaded sample is exposed to $H_2$, uptake begins and after 16 hours a compound of empirical formula $H_{1.6}MoO_3$ is produced.

EXAMPLE 6

A catalyst sample is prepared as in Example 1 and mixed with sufficient $SiO_2$ to make the final catalyst 50% $SiO_2$. Pellets are made and ground and the portion passing through 20 mesh screen and retained by a 40 mesh screen are retained for use. 5.81 grams of the 20/40 mesh $Pt/MoO_3/SiO_2$ are loaded into a pyrex tube and helium saturated with water vapor is passed over the catalyst for 1 hour. Hydrogen is then passed over the catalyst for 16 hours. This procedure converts the $MoO_3$ to $H_2MoO_3$. The hydrogen flow is stopped and a helium flow for 1 hour is used to flush unreacted $H_2$ from the reactor. The reactor is then heated to 80°C and pentene-1 passed through at 0.0947 ml per minute with helium as carrier gas, the helium to hydrocarbon ratio being 2.343. The weight hourly space velocity is 0.6369 grams pentene-1 per gram catalyst hour. The reaction is run for 90 minutes during which time 8.5 ml of pentene-1 passed through the reactor. Analysis of the product shows that 15% of the pentene-1 is converted to other material, 7% of this material being n-pentane and the remainder being isomers of pentene.

The invention claimed is:
1. A process for hydrogenating an olefin which consists of contacting vapors of said olefin at a temperature of from about 75°C. to about 200°C. with a compound of the formula $H_nMoO_3$ where n is about 1.5 to about 2.5.

2. The process of claim 1 where the olefin is pentene-1 and the catalyst is supported on silica.

* * * * *